Oct. 21, 1958    B. F. FORREST ET AL    2,856,639
METHOD OF ENCASING ELECTRIC COILS
Filed April 13, 1953    3 Sheets-Sheet 1
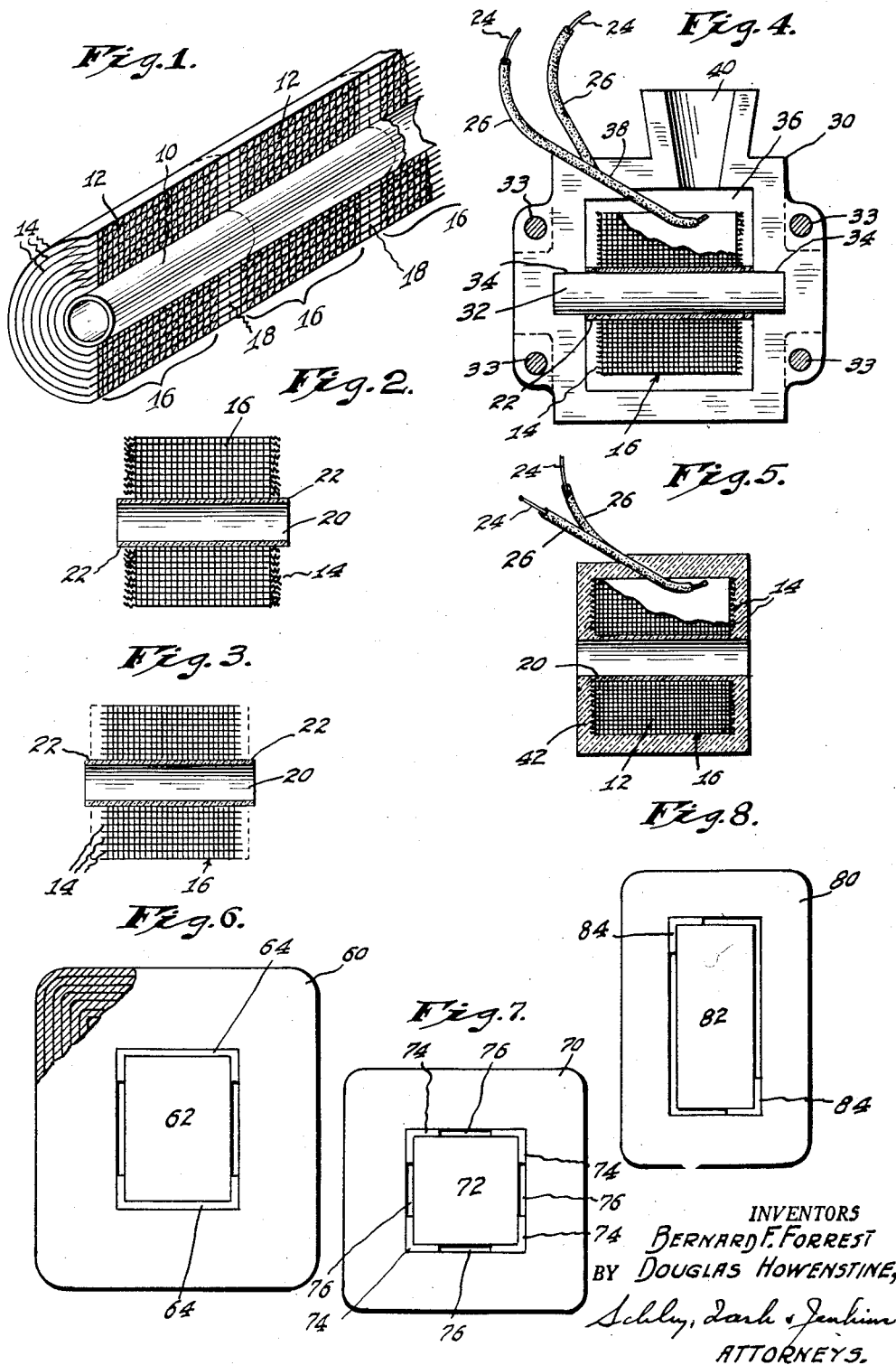
INVENTORS
BERNARD F. FORREST
BY DOUGLAS HOWENSTINE,
Schley, Dark & Jenkins
ATTORNEYS.

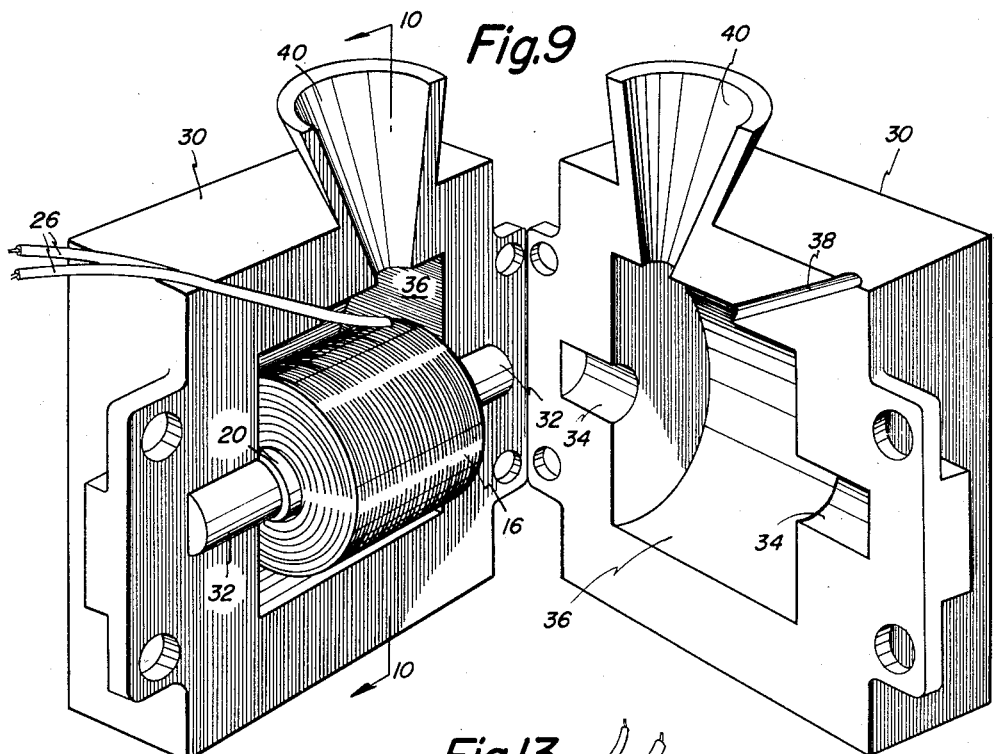
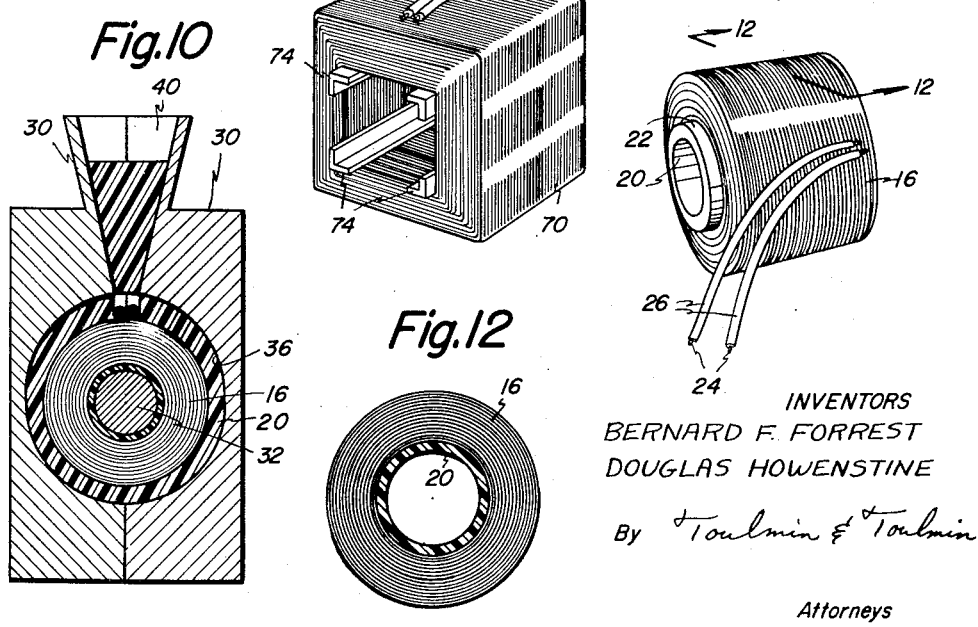

Oct. 21, 1958    B. F. FORREST ET AL    2,856,639
METHOD OF ENCASING ELECTRIC COILS
Filed April 13, 1953    3 Sheets-Sheet 3
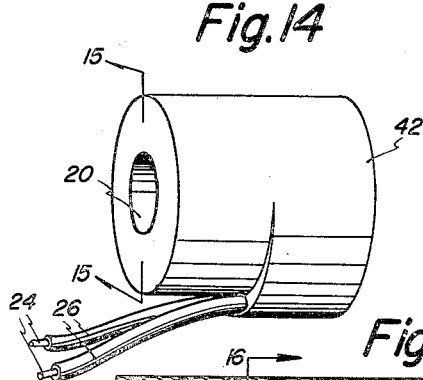
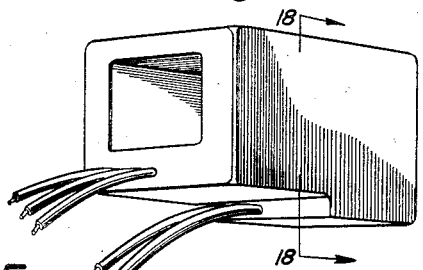
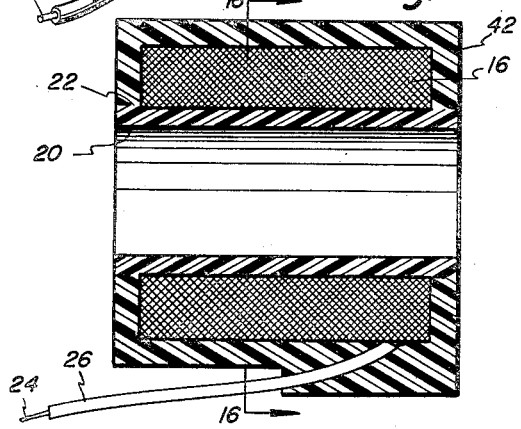
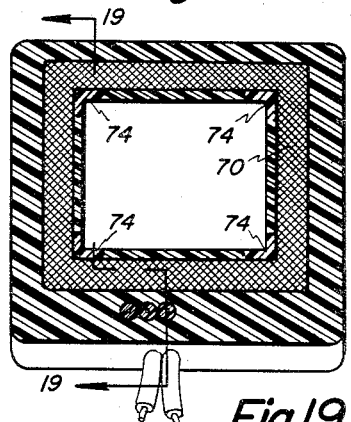
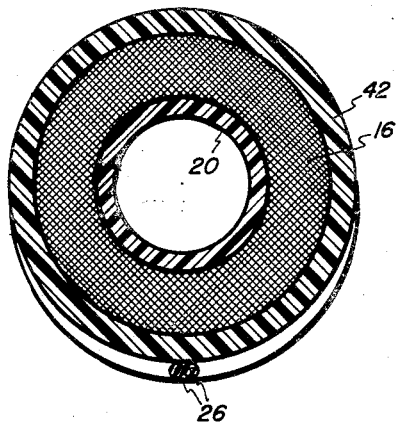
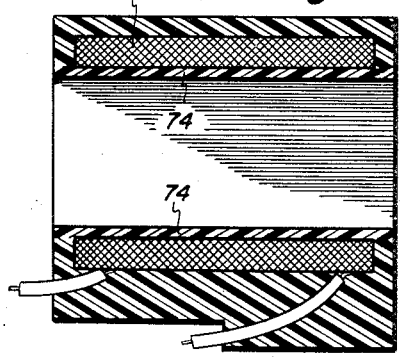
INVENTORS
BERNARD F. FORREST
DOUGLAS HOWENSTINE
BY
Toulmin & Toulmin
Attorneys United States Patent Office 2,856,639
Patented Oct. 21, 1958

2,856,639

METHOD OF ENCASING ELECTRIC COILS

Bernard F. Forrest and Douglas Howenstine, Wabash, Ind.

Application April 13, 1953, Serial No. 348,246

4 Claims. (Cl. 18—59)

This invention relates to the manufacture of electric coils, especially self-contained electric coils adapted to be assembled as such with other parts such as core parts, armatures, etc. in the manufacture of various electric mechanisms, and relates especially to the manufacture of such self-contained coils which are completely sealed and waterproofed by a casing extending not only around the exterior surfaces of the coil but also continuously through its central window opening.

In the prior manufacture of electrical coils, many expedients have been employed in an attempt to protect the coil from conditions under which it is required to operate, as under conditions of high humidity or where the coil is subject to immersion in water or other liquids. Coils have been coated with varnish and other coating materials, as by dipping the coil in a coating material, but such coatings have been thin and uneven and the process has not permitted the accurate control of coating thickness and uniformity, especially on the walls of the window opening. It has not been possible to provide an encased coil in which the casing extends through the window opening and is of accurately controlled, uniform, thin-wall section in the window opening. Prior coated coils have not withstood severe operating conditions and have been subject to a high rate of failure. Where prior high-quality coils have failed in a few minutes under a severe water immersed test, coils made in accordance with the present invention have stood up under such tests for many days.

It is an object of the invention to provide a method of manufacturing coils encased in a casing molded from epoxide resin or plastic.

The accompanying drawings illustrate the invention. In such drawings:

Fig. 1 is an isometric sectional view of a plurality of coils multiple-wound on a common supporting core tube;

Fig. 2 is a sectional view of a sub-assembly comprising one of such multiple-wound coils cut from the multiple-wound assembly and with the projecting edges of the coil insulation layers crushed inward to leave the ends of the core tube projecting beyond the coil body;

Fig. 3 is a sectional view of a coil on a supporting core tube and in which the insulating layers of the coil are cut to a width shorter than the length of the supporting tube;

Fig. 4 is a sectional view of a mold with a coil in position therein for casting a casing about the coil;

Fig. 5 is a sectional view of a finished coil;

Fig. 6 is a sectional view of a rectangular coil sub-assembly supported on a mold mandrel in which the preformed casing parts by which the coil is supported are a pair of channel sections;

Fig. 7 is a similar view in which the preformed casing parts by which the coil is supported on the mandrel are four angle sections;

Fig. 8 is a similar view in which the preformed parts are a pair of channel sections positioned at opposite corners of the core mandrel.

Figure 9 is an isometric view with the mold halves open and the coil in place before encasement;

Figure 10 is a section on the line 10—10 of Figure 9 when the mold halves are closed;

Figure 11 is an isometric view of the round coil and its resin core;

Figure 12 is a section on the line 12—12 of Figure 11;

Figure 13 is an isometric perspective view with the angular resin inserts in place in the rectangular opening of the coil;

Figure 14 is a perspective view of the completely encased round coil as cast;

Figure 15 is a longitudinal section on the lines 15—15 of Figure 14;

Figure 16 is a cross section on the lines 16—16 of Figure 14;

Figure 17 is an isometric perspective view of the encased square coil;

Figure 18 is a section on the line 18—18 of Figure 17; and

Figure 19 is a section on the line 19—19 of Figure 18.

The coil assembly shown in Fig. 1 comprises a supporting tube 10 long enough to form the core tubes for a plurality of coils, say 30 inches long, and of thin-wall section, say 0.030 inch thick. It is desirably formed by centrifugal casting of an epoxy resin casting composition. The method and apparatus for producing this tube and the composition of its compound is more fully set forth in the co-pending application, Serial No. 566,485 filed February 20, 1956, now abandoned. In such casting, a measured quantity of a mixture of raw resin and catalyst is introduced into a tubular form, and the form is spun on its axis, with the axis horizontal.

The winding operation may follow conventional practice. In forming the multiple-wound coil assembly shown in Fig. 1, the multiple-length thin-walled core tube 10 is mounted on a suitable supporting mandrel, and a plurality of wires 12 are wound on the tube 10 at spaced points therealong, and layers of insulating sheet material 14 are interposed between the successive layers of wire 12. This forms a plurality of coils 16 spaced from each other along the supporting tube 12 but commonly supported by the tube 10 and with the insulating layers 14 extending continuously from each coil to the next.

The several wound coils 16 are now separated by cutting through the insulating layers 14 and the supporting tube 10 as on the dotted lines 18. The coils 16 are carried on the individual-length core tubes 20 cut from the original tube 10, and initially the cut edges of the insulating material 14 of each coil are in the same planes with the ends of its core tube 20, and their edge portions project beyond the sides of the wound mass of wire 12. The free edges of the insulating material 14 are now reduced to cause the end portions 22 of the core tube 20 to project beyond the coil mass. As indicated in Fig. 2, this reduction is by crushing the edge portions of the insulating material 14 axially of the coil mass. Alternatively, marginal portions may be trimmed away, as to remove the portions between the dotted and full lines shown in Fig. 3. Whatever reduction treatment is employed, the resulting subassembly comprises the thin-walled core tube 20 carrying the coil 16 with its wire windings and its layers of insulating material 14, with the opposite end portions 22 of the core tube 20 projecting beyond the coil mass, a distance of say one-eighth inch. This coil sub-assembly is now "finished," as by electrically connecting suitable lead wires 24 to the ends of the winding wire or wires, and insulating and mechanically securing the inner ends of the lead wires 24 to the coil mass with tape or in any suitable or conventional manner.

The insulating sheaths or covers 26 on the lead wires 24 are desirably homogeneous cured plastic or resin coverings having high resistance to water and to corrosive liquids and gases, and which are sealed, either by bonding or by mechanically tight engagement, to the wires 24 over the entire length of the coverings. It would be desirable to use lead wires covered with an epoxide resin but to the best of our knowledge such resins cannot be extruded and it is not practically possible to provide wires with epoxide resin coverings. In the absence of epoxide-covered lead wires 24, we prefer to use lead wires covered with a polymerized polyvinyl chloride plastic or resin material, and wires so covered and insulated are readily available on the market at reasonable cost and of high quality.

With polyvinyl-resin covered wires, an effective sealing bond between the cast epoxide coil casing and the lead wire coverings 26 is ensured by applying a preliminary coating of epoxide adhesive composition to the inner end portions of the lead wire coverings 26, where they will be exposed to the casting material. Such coating strongly adheres to the coverings 26 and forms an impervious bond with the cast molding composition.

The prepared and "finished" coil sub-assembly is now placed in a suitably-formed mold 30 as indicated in Fig. 4. The mold is preferably of heat-conductive material to facilitate temperature control of the molding composition during the curing cycle, and coated interiorly with a suitable material to prevent sticking, such as silicone grease. The coil sub-assembly is supported in the mold on a mandrel 32 fitting through the coil core tube 20 and carried at its ends in suitable sockets 34 in the mold. The mold is desirably a two-part mold, separable in the plane of the section shown in Fig. 4 and secured together by bolts 33. The core tube 20 extends into abutment with the walls of the core cavity 36 about the sockets 34, and the outside surfaces of its projecting end portions 22 lie exposed to the cavity space between the coil and the cavity wall. The lead wires 24 extend through suitable passages 38 in the mold 30, and their inner ends, where they are coated with bonding composition as noted above, lie exposed in the cavity space.

The mold is desirably pre-heated to the temperature at which the casting composition is to be poured. The base resin material, a relatively heavy syrup-like liquid in the case of "Hysol 6020," is mixed with a catalyst, a thinner syrup-like liquid in the case of "Hardner C," to form a casting composition of thin-syrup consistency in which the resin-forming reaction immediately begins, with a resulting rise in temperature of the mixture. This is immediately poured through the throat 40 into the mold cavity 36, usually at a temperature of about 140° F., while still in a highly fluid state. The fluid composition fills the space within the cavity 36 and makes contact with the exposed surfaces of the projecting ends 22 of the core tube 20 and with the inner ends of the lead wire covers 26. To ensure complete filling and to eliminate any trapped air, the filled mold is placed under high vacuum, say at 29-30 inches of mercury, for a short period, and is then brought back to atmospheric pressure.

The pre-heated and filled molds, from which air pockets have been eliminated by the vacuum treatment, are now allowed to stand at room temperature for a period of about an hour, or for longer periods suitable to the production cycle. During this time the exothermic curing reaction continues and heat is dissipated by the mold to maintain the temperature below any point of damage to the coil. At the end of this time the casting composition will have solidified in the mold cavity 36 and the reaction will have slowed. To hasten further curing, the encased coil, while still in the mold, may now be heated for about an hour in an oven at 140° F. The encased coil is then desirably removed from its mold, and the curing of the now self-sustaining solid casing may be completed by heating the coil at a temperature of about 140° C. for about four hours.

The resulting encased coil is shown in section in Fig. 5. The coil body comprising the windings 16 and their insulating material 14 is completely encased by the epoxide resin casing. The inner portion of that casing, within the coil opening, is formed by the pre-cast core tube 20. Its projecting ends 22 are homogeneously joined to the cast outer portion 42 of the casing. The polyvinyl-chloride covered lead wires extend into and through the casing portion 42 and the casing material is hermetically bonded to the lead-wire coverings. The lead wires are of substantial length, as to lead from the operating position of the coil to a position of more favorable environment, and even in the absence of a bond between the wires and their cover, the leakage path along the wires between them and their coverings is of such length and the contact between the wires and their coverings is so tight that a full and effective seal is obtained. The coil is thus enclosed by a hermetically closed casing of an epoxide resin. The casing material is inert to substantially all liquids and vapors to which the coil may be exposed. It is completely waterproof. Coils made in regular commercial production withstand for many days test conditions which break down in a few minutes high-quality coils made in accordance with prior practices.

The making of rectangular coils may employ the modifications illustrated in Figs. 6 to 8. We have found it difficult to preform of epoxide resin a thin-walled rectangular tube suitable for lining the window openings of rectangular coils. In the modification shown in Fig. 6, the rectangular coil 60 is supported on the mold mandrel 62 by a pair of thin-walled channel sections 64. These may be made by casting the epoxide resin in a suitable channel shaped mold, with casting procedures similar to those described above. The cast channel members are cut to length so that when fitted within the window opening of the coil 60 they project outwardly from its end faces in the same way as the circular tube 20 shown in Fig. 4.

The rectangular coil 60 may be formed in any usual way, as by winding about a suitable mandrel which accurately forms its central window opening. The formed and "finished" coil 60 is firmly supported by the two channel sections 64 on the mold mandrel 62, and they form the four corners and the top and bottom side walls of the casing portion which lines the window opening of the rectangular coil. The other two sides of the window lining, between the opposed flanges of the two channels 64, are completed during the molding operation, by flow of molding composition into the spaces between those opposed flanges of the channel sections 64.

In the modification shown in Fig. 7, a coil 70 of square cross section is supported on a square mandrel 72 by four angular sections 74 pre-cast of the molding composition. These firmly support the coil 70 on the mandrel 72 and project beyond the end faces of the coil 70 to space that coil from the walls of the mold cavity and to expose exterior surfaces to which the thick end-wall of the cast casing may bond. The four angular sections 74 at the four corners of the mandrel 72 leave incomplete the side walls of the window lining, but hold the parts in fixed position to provide spaces 76 into which the mold composition may flow to complete those window side walls.

In the modification of Fig. 8, the rectangular coil 80 is supported on the mold mandrel 82 by two pre-cast angular sections 84, disposed at diagonally opposite corners of the mandrel. These angular sections 84 serve to form two corner portions of the window lining, and hold the coil 80 in spaced relation to the mandrel 82 so that molding composition may flow into the lining spaces and complete the casing walls which line the window opening.

With each of the modifications shown in Figs. 6 to 8, the casting procedure may be similar to that described in connection with Fig. 4, but the mold used will be suitably shaped to form the desired casing about the rectangular coil. In each case, the preformed casing parts 64, 74, and 84 will position the coil in the mold cavity and will be homogeneously bonded to the molding composition cast into that mold cavity, to form a complete homogeneous casing about the coil, with its window opening lined by a casing portion of thin-walled and accurate configuration.

We claim as our invention:

1. The method of making a completely resin encased waterproof electric coil which comprises the steps of supporting a coil on a preformed thin walled window lining casing part of resin with opposed ends of the casing part projecting beyond the ends of the coil, said coil being substantially centered axially on the casing part, mounting the thus supported coil on a mandrel with the mandrel extending through the window lining casing part and outwardly therefrom on each side of the casing part, placing the thus mounted coil in a mold with the said projecting ends of the casing part extending horizontally and abutting opposed inner walls of the mold to center the coil in the mold, said mandrel positioning the coil in the mold transversely of the axis of the casing part and spacing the said coil from the walls of the mold with the outer surface of the coil exposed, pouring into the mold spacing and over said coil and said ends of said casing part a resin liquid mass in uncured fluid state to thereby fill the mold and bring the uncured fluid resin mass into contact with said exposed end surfaces of the window lining casing part, and curing the resultant resin mass to bond it to said casing part and to form therewith a substantially integral solid resin casing about the coil and which casing extends in a thin walled section through the window opening of the coil.

2. The method of making a completely resin encased waterproof electric coil which comprises the steps of supporting a coil on a preformed thin walled window lining casing part of epoxy resin with opposed ends of the casing part projecting beyond the ends of the coil, said coil being substantially centered axially on the casing part, mounting the thus supported coil on a mandrel with the mandrel extending through the window lining casing part and outwardly therefrom on each side of the casing part, placing the thus mounted coil in a mold with the said projecting ends of the casing part abutting opposed vertically extending inner walls of the mold to center the coil in the mold with the mandrel and casing part extending horizontally in the mold, said mandrel centering the coil in the mold transversely of the axis of the casing part and spacing the said coil from the walls of the mold with the outer surface of the coil exposed, pouring into the mold spacing through an upper mold opening over said coil, and around the coil and said ends of said casing part while the mandrel retains the coil and casing part positioned, an epoxy resin liquid mass in uncured fluid state to thereby fill the mold and bring the uncured fluid resin mass into contact with said exposed end surfaces of the window lining casing part, and curing the resultant resin mass to bond it to said casing part and to form therewith a substantially homogeneous integral solid epoxy resin casing about the coil and which casing extends in a thin walled section through the window opening of the coil.

3. The method of making a completely resin encased waterproof electric coil which comprises the steps of winding a coil on a preformed thin walled window lining casing part of epoxy resin in the form of a cylindrical core tube of a wall thickness of about 0.030″ thickness with opposed ends of the core tube projecting beyond the ends of the coil, said coil being substantially centered axially on the core tube, mounting the thus supported coil on a mandrel with the mandrel extending through the core tube and outwardly therefrom on each side of the core tube, placing the thus mounted coil in a mold with the said projecting ends of the core tube extending horizontally and abutting opposed inner walls of the mold to center the coil in the mold, said mandrel centering the coil in the mold transversely of the axis of the core tube and spacing the said coil from the walls of the mold with the outer surface of the coil exposed, pouring into the mold spacing and over said coil and around the coil and said ends of said core tube an epoxy resin liquid mass in uncured fluid state to thereby fill the mold and bring the uncured fluid resin mass into contact with said exposed end surfaces of the core tube, and curing the resultant resin mass to bond it to said casing part and to form therewith a substantially homogeneous integral solid epoxy resin casing about the coil and which casing extends in a thin walled section through the window opening of the coil.

4. The method of making a completely resin encased waterproof electric coil of substantially rectangular section which comprises the steps of winding a coil on a preformed thin walled window lining casing part of epoxy resin in the form of separate channel sections supported on a substantially rectangular mandrel and in supporting relation with the coil, the channel sections being arranged to provide spaces between the channels and the mandrel within the window opening and which spaces extend completely through the window opening, said channels having opposed ends thereof projecting beyond the ends of the coil and the coil being substantially centered axially on the channels, placing the coil mounted on the channels and mandrel in a mold with the said projecting ends of the channels extending horizontally and abutting opposed inner walls of the mold to center the coil in the mold, said mandrel centering the coil in the mold transversely of the axis of the coil and spacing the said coil from the walls of the mold with the outer surface of the coil exposed, pouring into the mold spacing and over said coil and around the coil and into the spaces in the window opening an epoxy resin liquid mass in uncured fluid state to thereby fill the mold and said spaces, and bring the uncured fluid resin mass into contact with exposed end surfaces of the channels, curing the resultant epoxy resin mass to bond it to said channels and to form therewith a substantially homogeneous, integral, solid epoxy resin casing about the coil and which casing extends in a thin walled section through the window opening of the coil, and removing the mandrel from the encased coil.

References Cited in the file of this patent

UNITED STATES PATENTS

| | | |
|---|---|---|
| 1,326,366 | Milton | Dec. 30, 1919 |
| 1,427,324 | Priestley | Aug. 29, 1922 |
| 1,826,297 | Apple | Oct. 6, 1931 |
| 1,888,613 | Apple | Nov. 22, 1932 |
| 2,286,161 | Rights | June 9, 1942 |
| 2,478,633 | Lord | Aug. 9, 1949 |
| 2,479,400 | Pecoroni et al. | Aug. 16, 1949 |
| 2,534,119 | Gethmann | Dec. 12, 1950 |
| 2,646,535 | Coggeshall et al. | July 21, 1953 |

OTHER REFERENCES

Article—"Ethoxylines—A New Group of Triple-Function Resins," Electrical Manufacturing, July 1949, pp. 78–81, 164 and 166. (Copy in 260–47 EP.)

Article—"Epoxies—No Wonder," Modern Plastics, October 1952, pp. 89–94. (Copy in 260–47 EP.)

Article—"Application of Some Epoxide Resins in the Plastic Industry," British Plastics, October 1951, pp. 341–345. (Copy in 260–47 EP.)